United States Patent
Sasakawa et al.

(10) Patent No.: US 8,717,361 B2
(45) Date of Patent: May 6, 2014

(54) METHOD FOR GENERATING ORTHOPHOTO IMAGE

(75) Inventors: Tadashi Sasakawa, Tokyo (JP); Kikuo Tachibana, Tokyo (JP)

(73) Assignee: Pasco Corporation, Tokyo (JP)

( * ) Notice: Subject to any disclaimer, the term of this patent is extended or adjusted under 35 U.S.C. 154(b) by 123 days.

(21) Appl. No.: 12/863,682

(22) PCT Filed: Jan. 21, 2009

(86) PCT No.: PCT/JP2009/050808
§ 371 (c)(1),
(2), (4) Date: Jul. 20, 2010

(87) PCT Pub. No.: WO2009/093587
PCT Pub. Date: Jul. 30, 2009

(65) Prior Publication Data
US 2010/0295855 A1    Nov. 25, 2010

(30) Foreign Application Priority Data
Jan. 21, 2008    (JP) .................... 2008-010828

(51) Int. Cl.
G06T 15/10    (2011.01)
G06T 15/20    (2011.01)

(52) U.S. Cl.
USPC .......................................... 345/427

(58) Field of Classification Search
USPC ............................. 345/427; 348/144; 382/154
See application file for complete search history.

(56) References Cited

U.S. PATENT DOCUMENTS

| | | | |
|---|---|---|---|
| 6,130,705 A * | 10/2000 | Lareau et al. ................. | 348/144 |
| 6,704,460 B1 * | 3/2004 | Pitruzzello et al. ............ | 382/284 |
| 7,127,348 B2 * | 10/2006 | Smitherman et al. ......... | 701/409 |
| 2004/0167709 A1 | 8/2004 | Smitherman | |
| 2005/0089213 A1* | 4/2005 | Geng ............................ | 382/154 |

FOREIGN PATENT DOCUMENTS

| | | |
|---|---|---|
| JP | 2000-182059 A | 6/2000 |
| JP | 2006-507483 A | 3/2006 |
| JP | 2007-159047 A | 6/2007 |

OTHER PUBLICATIONS

Chinese Final Office action with English translation for application No. 200980102630.7.
European Search Report.
D1; "Digital orthoimage from airborne line scanner imagery utilizing flight parameters", by Wanpeng Zhang et al. Technical University of Berlin, Germany and Curtin University of Technology, Perth, Western Australia; Entire document; 1994; Place of publication is unknown.

(Continued)

Primary Examiner — Kee M Tung
Assistant Examiner — Frank Chen
(74) Attorney, Agent, or Firm — Tracy M. Heims; Apex Juris, pllc

(57) ABSTRACT

The method includes divisionally-capturing a target region from a platform such as an airplane (1) by rendering viewing angles as being different from each other as well as rendering a focal length (f, f') as being different with reference to a predetermined ground resolution, thereafter generating an elevation model (5) of the entire target region (1) in accordance with matching of elevation models (3, 3) generated based on respective divisionally-captured images (2) between image capturing overlap regions (4), and generating an orthophoto image of the entire target region by applying an orthogonal projection transformation processing to the respective divisionally-captured images (2) by use of altitude information of the elevation model (5).

5 Claims, 9 Drawing Sheets

(56) References Cited

OTHER PUBLICATIONS

D2; "Semi-Autromatic True Orthophoto Production by Using LIDAR Data", by Gunay A et al. Stuttgart University of Applied Sciences; Entire Document; 2007; Published in Stuttgard, Germany.

D3;"LiDAR-Derived High Quality Ground Control Information and DEM for Image Orthorectification", by Xiaoye Liu et al.; Springer Science and Business Media, LLC; Entire Document; Jan. 4, 2007; Published Online in Australia.

D4; "True Orthoimages" by Mayr W; Technical University of Munich, Germany; Entire Document; Apr. 2002; Published in the Netherlands.

D5; "A Comprehensive Study on Urban True Orthorectification", by Chen W et al. US National Science Foundation and IEEE; Entire Document; Sep. 2005; Published in USA.

D6; "Experiences with the production of digital orthophotos", by Hohle J Aalborg University, Aalborg, Denmark; Entire Document; Oct. 1996; Published in Denmark by Photogrammatric Engineering & Remote Sensing (PE&RS).

D7; "Digital orthophoto generation based on a high-quality DTM", by Robert Ecker; University of Technology Vienna, Austria; Entire Document; ITC Journal; 1992; Published in the Netherlands.

D8; "The UltraCam large formataerial digital camera system", Leberl et al; Reprinted for Proceedings of the American Society For Photgrammetry & Remote Sensing at Anchorage, Alaska; Originally published by the Institute for Computer Graphics and Vision, Graz University of Technology, Vexcel Imaging Austria, Graz, Austria; Entire Document; May 2003; Published in Anchorage, Alaska.

D9; "Geometric test field calibration of digital photogrammetric sensors", by Honkavaara E et al Finnish Geodetic Institute; Entire Document; Jun. 21, 2006; Published by Elsevier B.V. in the Netherlands.

Decision of Dismissal dated Aug. 31, 2012, in counterpart Chinese Patent Application 200980102630.7, 5 pages (Chinese).

Decision of Dismissal dated Aug. 31, 2012, in counterpart Chinese Patent Application 200980102630.7, 5 pages (English Translation).

* cited by examiner

ID FOR GENERATING
ORTHOPHOTO IMAGE

METHOD FOR GENERATING ORTHOPHOTO IMAGE

TECHNICAL FIELD

This invention relates to a method for generating an orthophoto image and a photographing device.

BACKGROUND ART

An orthophoto image widely utilized for creation of a topographic map or as a photographic map is generated by applying an orthogonal projection transformation processing to a central perspective projection image obtained by capturing a target region from the air. Recently, the image capturing equipment tends to be shifted from the conventional analog camera to a digital camera for the purpose of, for example, improving operating efficiency. For example, a UCD (Ultra-CamD) from VEXCEL in Austria substitutes for the conventional analog aerial camera as an analog camera for use in capturing from an airplane.

The UCD is classified into a so-called area sensor which records a predetermined area at a time as with the conventional analog aerial camera. The UCD is mounted with a plurality of CCDs and lenses in order to obtain a resolution and a capturing range equivalent to the analog aerial camera by means of an imaging device with an insufficient performance. A region to be captured is divisionally-captured as a plurality of panchromatic images, utilizing the CCDs and the lenses, whereby a wide range region is captured, and a ground resolution as the panchromatic image is improved. In the conversion of the captured image into a color image, a color image with a lower resolution is obtained by a plurality of CCDs and lenses different from the above ones, and a so-called pan-sharpening processing for synthesizing with the panchromatic image is performed, whereby the color captured image can be obtained.

Patent Document 1 describes a similar technique. In this prior art example, a wall surface is merely captured, and the image capturing equipment is not mounted in a moving platform such as an aerial camera, the image capturing distance is not extremely large, and versatile coordinate information such as a ground coordinate system is not obtained. The entire wall painting is captured as an index image, and, at the same time, the wall painting is captured to be divided into divisional detailed images. The detailed images are standardized utilizing the corresponding points of the index image, and they are connected with each other with reference to the index image. The brightness and color tone of the connected image are adjusted with reference to the index image.

Patent Document 1: Japanese Patent Application Laid-Open No. 2000-182059

DISCLOSURE OF THE INVENTION

Problem to be Solved by the Invention

However, in the image capturing using the UCD, when a target region is divisionally-captured using a plurality of CCDs and lenses, that is, cameras, these cameras are made to converge on a single focal point, and they are operated as if it were a single analog aerial camera. Therefore, the image capturing using the UCD has a disadvantage that the cameras should be extremely precisely adjusted. Especially, in the image capturing from a moving platform such as an airplane, such a requirement may not be able to be satisfactorily satisfied under some environmental conditions such as an air current.

In the above image capturing of a wide range target region with a single camera focus, especially in the image capturing from the air where the image capturing distance is extremely large, distortion occurring at a position far from the central area is large, and, in addition, the ground resolution is significantly different between the center and periphery of the target region, therefore resulting in lacking the uniformity of image quality.

The present invention has been made in order to solve the above problems, and it is, therefore, an object of the present invention to provide a method for generating an orthophoto image that can realize relatively easy image capturing and generation of an orthophoto image with high image quality. Another object of the present invention is to provide a image capturing device suitable for image capturing utilizing the method for generating the orthophoto image.

Means for Solving the Problem

According to the present invention, the above objects are achieved by providing a method for generating an orthophoto image. The method includes divisionally-capturing a target region 1 from a platform such as an airplane by rendering viewing angles as being different from each other as well as rendering a focal length f as being different with reference to a predetermined ground resolution, thereafter generating an elevation model 5 of an entire target region in accordance with matching of elevation models 3 generated based on respective divisionally-captured images 2 among image capturing overlap regions 4 and 4, and generating an orthophoto image of the entire target region 1 by applying an orthogonal projection transformation processing to the respective divisionally-captured images 2 by use of altitude information of the elevation model 5.

In the present invention, the wide range target region 1 is divisionally-captured so that the viewing angles from a platform such as an airplane are different from each other. In each image capturing, the focal length f is different so that a predetermined ground resolution is satisfied. Thus, it is not necessary to precisely adjust a plurality of cameras for the sake of converging on a single focal point, and it is enough that each camera for use in image capturing can hold the capturing orientation corresponding to a captured region in part; therefore, image capturing can be relatively easily performed. Further, the focal length f is adjusted to thereby allow the divisionally-captured images 2 to have a predetermined ground resolution, whereby an image quality of a wide range captured image generated by combination of the divisionally-captured images 2, 2, ..., and ranging the entire target region 1 can be uniformized relative to the above prior art example, and, at the same time, the image quality can be extremely enhanced.

In general, a captured image obtained by central perspective projection can be represented by a coordinate system whose origin is a focus upon image capturing. As described above, the UCD using a plurality of digital cameras having a common focus has an advantage that only by adjusting rotation around the coordinate axes and scale, divisionally-captured images and elevation models, including altitude information represented as a numerical value and generated based thereon, can be well matched. According to this constitution, the prior art matching method using an analog aerial camera can be diverted as it is. Meanwhile, the present invention proposes a new matching method different from the prior art example merely recreating an analog camera. For example, in a case of an aerial camera capturing at an extremely long capturing distance, even when the focal length f is slightly different between divisionally-captured images, the elevation model 3 generated based on each divisionally-captured image, that is, so-called digital terrain models or digital surface models are adjusted and matched, whereby suitable accuracy can be maintained. The present invention utilizes this constitution.

Further, when color image capturing is performed as the above image capturing, deterioration of a radiometric resolution due to a pan-sharpening processing is eliminated, and an orthophoto image with well balanced ground resolution and color depth can be obtained. The elimination of the pan-sharpening processing can further enhance the operating efficiency.

In addition, in the image capturing in which the viewing angles from a platform are different, when image capturing in the direction at the nadir of the platform is also performed, an image more similar to an orthogonal projection image can be obtained. Therefore, a highly accurate captured image and the elevation model 5 with high accuracy based on the captured image can be obtained. In that case, the elevation model 3 in other directions than the direction at the nadir of the target region 1 are aligned so as to be expelled with reference to the elevation model 3 in the nadir direction. Namely, when expansion is performed in sequence to the outward direction based on the elevation model 3 in the nadir direction, the accuracy of the elevation model 5 of the entire target region can be further enhanced.

The matching between the elevation model 3 and 3 can be performed, specifically, by matching between the suitable image capturing overlap regions 4 provided in the divisionally-captured images taken at different viewing angles from a platform. The elevation model 3 and 3 are matched utilizing a ground reference point imparting the altitude information to the elevation model 3, or a mesh is set on the image capturing overlap region 4, and the elevation model 3 and 3 can be matched in units of cells 6 in the mesh. As described above, in the present invention in which the elevation model 3 and 3 generated based on the divisionally-captured images with different focal length f are matched, in the coordinate alignment in units of the cells 6, the best alignment between the cells 6 and 6 is performed, for example, in units of a plurality of cells 6, 6, . . . , and therefore, a least square method is preferably used. When the focal length f is different, the discrepancy between the elevation model 3 and 3 occurs not only on a plane, but also in the height direction, and therefore, it is preferable that the discrepancy is adjusted simultaneously in the longitudinal, lateral, and height directions. However, when a ground surface is captured from the air, the discrepancy occurring in the height direction accounts for the majority, and therefore, the discrepancy is adjusted only in the height direction, whereby the correction efficiency of the discrepancy can be enhanced.

Further, in the generation of the orthophoto image, an image capturing device, which divisionally-captures a target region 1 from above with a plurality of cameras 7, 7, . . . , can be utilized. The photographing device includes a nadir camera 7A whose orientation is held so that the nadir camera is directed in a nadir direction, an obliquely-downward camera 7B whose orientation is held so that the obliquely-downward camera is directed in an obliquely-downward direction, and an obliquely-downward camera setting unit 8 which sets a focal length f' of the obliquely-downward camera 7B, having a resolution of an object substantially equal to that of the nadir camera 7A, in accordance with an inclination angle of an orientation relative to the nadir direction.

In the generation of an orthophoto image based on a an aerial photograph, in which the flying height of, for example, an airplane is changed in accordance with the size and terrain of the target region 1 to be captured, an image capturing device which can easily change a setting of capturing conditions corresponding to the change of the flying height is preferably used. In the divisional capturing of the target region 1 from above or from the air when the ground resolution is uniform, when the focal length f of the nadir camera 7A capturing in the direction at the nadir of the platform is determined, the focal length f' of the obliquely-downward camera 7B capturing, from the other direction, that is, a platform, in the obliquely-downward direction with a predetermined angle is also uniquely determined by the depression angle. Considering this, in the present invention, the obliquely-downward camera setting unit 8 setting the focal length f' of the obliquely-downward camera 7B in accordance with the focal length f of the nadir camera 7A is provided, and the load of the adjustment operation between the cameras 7, 7, . . . , with the change of the flying height is reduced.

Effects of the Invention

As seen in the above description, the present invention can provide a method for generating an orthophoto image that can realize relatively easy capturing and generation of a high quality orthophoto image, and therefore, the creation of a topographic map and acquisition of a photographic map can be more efficiently performed. Further, an image capturing device, which is suitable for capturing utilizing the method for generating the orthophoto image, is provided, whereby the operating efficiency at capturing can be extremely enhanced.

BEST MODE FOR CARRYING OUT THE INVENTION

FIG. 1 shows an outline of divisionally-capturing of a target region 1. In this embodiment, an orthophoto image of the extremely wide range of target region 1 is obtained using digital cameras 7. Namely, the wide target region 1 of the ground is divisionally-captured from an airplane (platform) (not shown) overhead to obtain a plurality of divisionally-captured images 2, and the divisionally-captured images 2 are then synthesized, whereby the orthophoto image of the extremely wide range of target region 1 is generated. As shown in FIG. 1A, the airplane is loaded with an image capturing device A, which captures a wide range by compounding divisionally-captured images in a direction perpendicular to the flight direction of the airplane, so that the entire target region 1 can be captured in a single flight.

The image capturing device A has a directly-below camera 7A capturing at the nadir of the airplane and obliquely-downward cameras 7B capturing obliquely downward the airplane. In this embodiment, the four obliquely-downward cameras 7B widen the capturing range of the nadir camera 7A in the direction perpendicular to the flight direction of the airplane, and the capturing ranges of a total of five cameras 7 are compounded substantially like a belt in the direction perpendicular to the flight direction. The image capturing range of each of the cameras 7 and the capturing ranges of the adjacent cameras 7 are partially overlapped, and a side overlapped rate Rs for use in the formation of a capturing overlap region 4 is set to, for example, 30% of the entire width. As described later, the side overlapped rate Rs is used for alignment of elevation model 3 and 3 generated based on divisionally-captured images 2. As each of the cameras 7, a relatively inexpensive "EOS-1 Ds Mark III" from Canon Inc. is used. This camera has a high depiction performance, that is, about two million of the number of effective pixels, for example, and is loaded with a CMOS as an imaging device.

The image capturing device A is provided with an orientation holding unit 11 which holds a predetermined capturing orientation of each of the cameras 7, that is, predetermined viewing angles from the airplane and a focal length setting unit (obliquely-downward camera setting unit 8) which manages a focal length f. The image capturing orientation of each of the cameras 7 and the relative position between the cameras 7 are held by the orientation holding unit 11 constituted as, for example, a camera stand. The image capturing orientation of the obliquely-downward camera 7B can be changed to an arbitrary capturing orientation.

The focal length setting unit 8 is constituted of, for example, a luggable computer connected to each of the cameras 7 and sets and manages the focal length f of each of the cameras 7 by means of a program operating on the computer. The image capturing orientation of each of the cameras 7 can be detected by a sensor (not shown) connected to the orientation holding unit 11 and provided in the orientation control unit 11. The focal length setting unit 8 sets a focal length f', allowing the obliquely-downward cameras 7B to exhibit the ground resolution substantially equal to the ground resolution in the capturing performed by the nadir camera 7A, in accordance with the capturing orientation of each of the obliquely-downward cameras 7B, obtained from the orientation holding unit 11, and the focal length f set to the nadir camera 7A. More specifically, the image capturing orientation of each of the obliquely-downward cameras 7B is an inclination angle with respect to a nadir direction of the capturing orientation of each of the obliquely-downward cameras 7B.

Namely, a region to be captured is regarded as a plane, and, for example, a relative image capturing distance ratio of each of the obliquely-downward cameras 7B to the nadir camera 7A is calculated using the viewing angles from an airplane flying in parallel with the plane. The focal length f' is set based on the ratio and the focal length f set to the nadir camera 7A so that each of the obliquely-downward cameras 7B can obtain the ground resolution equal to the ground resolution of the nadir camera 7A. FIG. 2A schematically shows a relation between the nadir camera 7A and one of the obliquely-downward cameras 7B including a capturing range adjacent to the capturing range of the nadir camera 7A. An image capturing distance D' of the obliquely-downward camera 7B is determined with reference to a distance between a principal point 12 of a lens of the obliquely-downward camera 7B and a photographic principal point 13 that is the center point of the capturing range in the target region 1. In FIG. 2A, a reference numeral 14 denotes a lens of the nadir camera 7A, a reference numeral 15 denotes the principal point of the lens, a reference numeral 16 denotes a focus, a reference numeral 17 denotes a photographic principal point of the nadir camera 7A, a reference numeral D denotes an image capturing distance of the nadir camera 7A, a reference numeral 18 denotes the lens of the obliquely-downward camera 7B, and a reference numeral 19 denotes a focus. The arrows showing the axis directions of a coordinate system in FIG. 2A respectively show the axis directions of the coordinate system based on the image capturing orientation of the cameras 7A and 7B. The obliquely-downward camera 7B maintains a predetermined capturing range by adjusting a field angle with the change of the focal length f'.

Specifically, for example, a flying height of the airplane is determined in a stage of planning a capturing plan to be described later (S1 of FIG. 9), whereby the image capturing distance D of the nadir camera 7A shown in FIG. 2A is determined. When the image capturing distance D is determined, the focal length f and the field angle of the nadir camera 7A are determined based on a desired ground resolution. If the obliquely-downward camera 7B is located at the same position as the nadir camera 7A, based on the field angel of the nadir camera 7A determined as described above, the image capturing angle and the field angle of the obliquely-downward camera 7B can be determined with reference to the side overlapped rate Rs. When the image capturing angle of the obliquely-downward camera 7B is determined as described above, the image capturing distance D' of the obliquely-downward camera 7B can be obtained using a trigonometric function, based on the image capturing distance D of the nadir camera 7A. When the image capturing distance D' is determined, the focal length f' of the obliquely-downward camera 7B can also be determined based on a desired ground resolution.

The computer constituting the focal length setting unit 8 includes, for example, a table in which the image capturing distance D (D') and the focal length f (f') are associated corresponding to the ground resolution and a table in which the focal length f of the nadir camera 7A and the image capturing angle of the obliquely-downward camera 7B are associated corresponding to the side overlapped rate Rs. When the flying height as the image capturing distance D is input while the ground resolution and the side overlapped rate Rs are previously set, the focal lengths f and f' of the nadir camera 7A and the obliquely-downward camera 7B and the image capturing angle of the obliquely-downward camera 7B are calculated using those tables. The focal lengths f and f' are set respectively to the nadir camera 7A and the obliquely-downward camera 7B based on the calculation result. After that, it is only necessary to change the image capturing orientation of the obliquely-downward camera 7B to the image capturing angle obtained by the calculation. For example, when the image capturing orientation of the obliquely-downward camera 7B can be controlled by the orientation holding unit 11, the focal length setting unit 8 may output an instruction to the orientation holding unit 11 so that the orientation of the obliquely-downward camera 7B is changed to the image capturing orientation at a predetermined image capturing angle.

The airplane loaded with the image capturing device A is made to fly in the direction shown by the void arrow in FIG. 1B, and image capturing is performed at positions shown by white circles on the arrow, that is, at a predetermined positional interval. In that case, as shown in FIG. 1B, a single flight can cover a wide range by using a plurality of captured images (S2 of FIG. 9). In FIG. 1B, Ro is an overlapped rate set between the captured images in the flight direction of each of the cameras 7 and, for example, 60% of the entire length, whereby the target region 1 is captured so as to be overlapped over the entire region. A GPS and an IMU (Inertial Measurement Unit) are mounted in the airplane loaded with the image capturing device A, whereby the position and orientation of the cameras 7 upon capturing (roll angle ω, pitch angle φ, and yaw angle κ) are recorded, so that external standardization factors of each of the divisionally-captured images 2 can be obtained.

In the image capturing using the image capturing device A and the airplane, a plan for setting an airplane's flight path corresponding to, for example, the size of the target region 1 to be captured, the focal length f of each of the cameras 7 corresponding thereto, and the like is previously planned (S1 in FIG. 9). A GCP 20 (Ground Control Point, ground reference point) in which a plan position and an altitude have been previously measured by control point survey is set to the target region 1. FIG. 3A shows an example of the target region 1. Reference numerals 21 and 22 denote respectively elevated highways and buildings. Chain double-dashed lines are image capturing ranges covered by a single image capturing by the five cameras 7 of the image capturing device A.

In FIG. 3B, for ease of understanding, regarding the captured images sequentially obtained accompanying the flight of the airplane, the ranges of only some divisionally-captured images 2' taken by the nadir camera 7A are overlapped with the target region 1 as shown by chain double-dashed lines. In FIG. 3B, the ranges of the divisionally-captured images 2' are slightly deviated in the direction perpendicular to the flight direction of the airplane. FIG. 4A is an enlarged view of the relevant portion of FIG. 3B. As described above, capturing overlap regions 4 are formed in the flight direction of the airplane in accordance with a predetermined overlapped rate Ro.

In the following description, the processing procedure of the present invention is illustrated for ease of understanding; however, in fact, graphing as exemplified is not required, and the processing is performed only by calculation for the divisionally-captured images 2. The following method can be automatically performed by a computer operating a program described with the following procedure. FIG. 2B shows a block diagram of a computer constituted as an orthophoto image generating device B.

The orthophotographic image generating device B has an input section 23 and an operation section 24. The input section 23 includes a captured image input part 23a, an image capturing condition input part 23b, and a ground reference point position data input part 23c. The captured image obtained as described above is input to the captured image input part 23a. The information of a camera position and a camera orientation by GPS and IMU at image capturing is input to the capturing condition input part 23b. The positional information of the GCP 20 is input to the ground reference point position data input part 23c.

The operation section 24 has a tie point setting unit 24a, an elevation model generating part 24b, an inter-elevation model matching part 24c, an orthogonal projection transformation processing part 24d, and a mosaic processing part 24e. As described above, the divisionally-captured images 2 input to the captured image input part 23a are first extracted so that suitable regions included in the two or more divisionally-captured images 2 are set to tie points 25 by the tie point setting unit 24a. The tie points 25 are extracted only from between the divisionally-captured images 2 and 2 obtained by the cameras 7 with the same focal length f. Namely, tie points 25 have a function for associating the relative positions of the divisionally-captured images 2 and 2 arranged in the flight direction. The tie points 25 are shown by black circles in FIG. 4A.

The elevation model generating part 24b generates, based on a plurality of captured images formed in a continuous strip form so as to be associated with the flight direction as described above, the information of the camera position and the camera orientation corresponding to individual divisionally-captured images 2 input to the image capturing condition input part 23b as described above, and the positional information of the GCP 20 displayed in the divisionally-captured image 2 and input to the image capturing condition input part 23b as described above, DSMs 3 (Digital Surface Models, elevation models) which are strip regions similar to the continuous strip captured images (S3 of FIG. 9). The DSM 3 can be generated by, for example, stereo matching utilizing the image capturing overlap region 4 ranging the entire target region 1 by virtue of the overlapped rate Ro. In the stereo matching, the matching accuracy can be enhanced by utilizing the information of the position and orientation of the cameras 7 and 7 constituting the image capturing overlap region 4. Further, by virtue of the use of the positional information of the GCP 20, the positional information can be imparted to a stereo model formed by matching. The GCP 20 is shown by a white circle in FIG. 4A, and the generated strip-shaped DSMs 3 are shown in FIG. 4B.

The five strip-shaped DSMs 3 generated as above and corresponding to the five cameras 7 are matched by the inter-elevation model matching part 24c (S4 of FIG. 9), whereby DSM 5 ranging the entire wide target region 1 is generated. The inter-elevation model matching part 24c matches the adjacent strip-shaped DSMs 3 and 3, utilizing the overlap regions of the adjacent strip-shaped DSMs 3, that is, the image capturing overlap regions 4 generated in the direction perpendicular to the flight direction based on the side overlapped rate Rs. FIG. 5A selectively shows only the strip-shaped DSM 3, covering the central part of the target region 1, and strip-shaped DSM 3' adjacent to the right side of the DSM 3 of the central part in FIG. 4B.

In the matching between the DSMs 3 and 3', a mesh with an interval of, for example, 5 m is set to the overlap regions 4 of the strip-shaped DSMs 3 and 3' and the vicinity of the GCP 20. The coordinate values of each cell 6 corresponding to each other between the meshed DSMs 3 and 3' are adjusted to approximate between the DSMs 3 and 3', whereby the DSMs 3 and 3' are matched. FIG. 5B shows enlarged views of the relevant portions of the two strip-shaped DSMs 3 and 3' of FIG. 5A when the mesh is set on each of the entire regions of the DSMs 3 and 3'. When the size of the cell 6 is larger than the size of a pixel of the captured image, as the coordinate value of each of the cells 6, the coordinate value of the pixel of the central part of the cell 6 can be used.

As shown in FIG. 5B, regarding the cells 6 belonging to the overlap region 4 of the DSMs 3 and 3' to be adjusted to approximate each other, one cell in the DSM 3 is indicated by 6A, and the other cell in the DSM 3' is indicated by 6B. In this embodiment, considering the operating efficiency, the adjustment for approximation is performed only in the height direction, that is, the altitude direction. When the coordinates value of each of cells 6A and 6B are $(kXi, kYi, kZi)$, it is assumed that the Z coordinate $kZi$ after conversion satisfies such a linear expression for adjustment that $kZi'=KZi+ka+kbkXi+kckYi$. k represents a course number, and i represents a cell number. ka, kb, and kc are unknowns.

Specifically, a, b, and c satisfying such an equation that $kZi+ka+kbkXi+kckYi=k+1Zi+k+1a+k+1bk+1Xi+k+1ck+1Yi$ are obtained based on the linear expression, whereby the adjustment for approximation is performed. However, $kXi=k+1Xi$ and $kYi=k+1Yi$ are required. The adjustment for approximation is applied to all the cells 6, 6, . . . , belonging to, for example, the overlap region 4 between the DSMs 3 and 3' which are strip-shaped regions, and the overlap regions 4 of the DSMs 3 and 3' are matched. The positional relation of the DSMs 3 and 3' is adjusted in accordance with the matching. Since the coordinate values of the cell 6 near the GCP 20 are highly reliable, it is preferable that the cell 6 near the GCP 20 is adjusted while being weighted relative to the matching of the other cells 6 belonging to the overlap region 4.

In the matching between the strip-shaped DSMs 3 and 3', first, the DSM 3 based on the divisionally-captured image obtained by the highly reliable nadir camera 7A and the DSM 3' based on the divisionally-captured image, obtained by the obliquely-downward camera 7B capturing a range included in the target region 1 and adjacent to the capturing range of the nadir camera 7A, are matched. Thereafter, the DSM, in which the strip-shaped DSMs 3 and 3' are matched in this way, and the DSM 3 based on the divisionally-captured image 2, obtained by another obliquely-downward camera 7B more distant from the capturing range of the nadir camera 7A, are matched, whereby the reliability can be further enhanced.

A plurality of the DSMs 3 and 3' which are rectangular-shaped regions are matched as above, whereby the wide range DSM 5 shown in FIG. 6A ranging the entire target region 1 is obtained. Thereafter, in the operation section 24, a plurality of the rectangular-shaped captured images, that is, the divisionally-captured images 2 arranged in the flight direction of a single camera 7 and associated by the tie points 25 are sequentially subjected to the orthogonal projection transformation processing utilizing the wide range DSM 5 by the orthogonal projection transformation processing part 24d (S5 in FIG. 9). In FIG. 6A, a rectangular-shaped captured image obtained by associating the divisionally-captured images 2, obtained by the nadir camera 7A, by the tie points 25 are overlapped with the DSM 5 and shown by chain double-dashed lines.

The orthogonal projection transformation processing part 24d is constituted of suitable commercial available orthogonal transformation software and transforms the captured image, taken by each camera 7 by center projection, into orthogonal projection. In the orthogonal transformation, as exemplified in FIG. 6B, the optical path of a camera 7'at image capturing is blocked by, for example, a high building existing in the target region 1. Therefore, when the coordinates of a white point of FIG. 7 is recognized as the coordinates of a black point, that is, when the positional information is not accurately reflected in the captured image, correction is performed using the altitude information of the DSM 5. As shown in FIG. 7, the correction can be performed using a trigonometric function based on the inclination angle θ of the optical path specified by, for example, the IMU and the orientation holding unit 11 and the height h of a building specified by the DSM 5.

The captured images processed by the orthogonal projection transformation processing part 24d are shown in FIG. 8A. In this state, the captured images each have a rectangular shape corresponding to the capturing ranges continuous in the flight direction of each camera 7 as in the above case, and the image capturing overlap region 4 based on the side overlapped rate Rs is formed in each rectangular-shaped captured image. Those rectangular-shaped captured images are connected, utilizing the image capturing overlap region 4, by the mosaic processing part 24e constituted of suitable mosaic software (S6 in FIG. 9). According to this constitution, as shown in FIG. 8B, a wide range orthophoto image obtained by integrating the entire target region 1 is generated. The orthophoto image can be output from the output section 26 of the orthophoto image generating device B.

In the above description, the entire target region 1 can be captured in a single flight; however, even when the target region 1 is divisionally-captured in a plurality of flights on different courses, the images obtained by a plurality of image capturing are synthesized by alignment of these courses, whereby the orthophoto image of the entire target region 1 can be similarly obtained. In that case, the captured images in the courses are synthesized by the mosaic processing part 24e, whereby the orthophoto image ranging the entire target region 1 can be obtained; however, when the images in the courses are synthesized before the formation of the DSM 3 using the GCP 20 and the tie points 25, the accuracy of the DSM 5 in the entire target region 1 can be further enhanced. In addition, the accuracy of the generated orthophoto image of the entire target region 1 can be further enhanced.

Further, in the above description, the captured images, which are taken by the single nadir camera 7A and the plurality of obliquely-downward camera 7B so as to be compounded like a belt, are obtained at a predetermined flying position whose positional information is obtained by the GPS; however, for example, the image capturing orientation and the like of the obliquely-downward camera 7B are changed, and image capturing can be performed so that the periphery of the image capturing range of the nadir camera 7A is surrounded by the capturing range of the obliquely-downward cameras 7B. In that case, the captured images obtained by the cameras 7 are compounded, whereby a relatively large rectangular-shaped captured image can be obtained.

Furthermore, the obliquely-downward cameras 7B of the image capturing device A are disposed so as to be arranged along with the nadir camera 7A in the flight direction of an airplane, the capturing timing of each of the cameras 7 is rendered different in accordance with the flight speed, and the capturing point of the nadir camera 7A is made to be the same as the capturing point of the obliquely-downward camera 7B. This constitution can further enhance the accuracy of the DSM 3.

Industrial Applicability

According to the present invention, mainly when an orthophoto image is utilized for creation of a topographic map, or when the orthophoto image is utilized as a photographic map, the image capturing can be relatively easily performed, and a high quality orthophoto image can be obtained.

Description of Reference Numerals

Figure 1A:
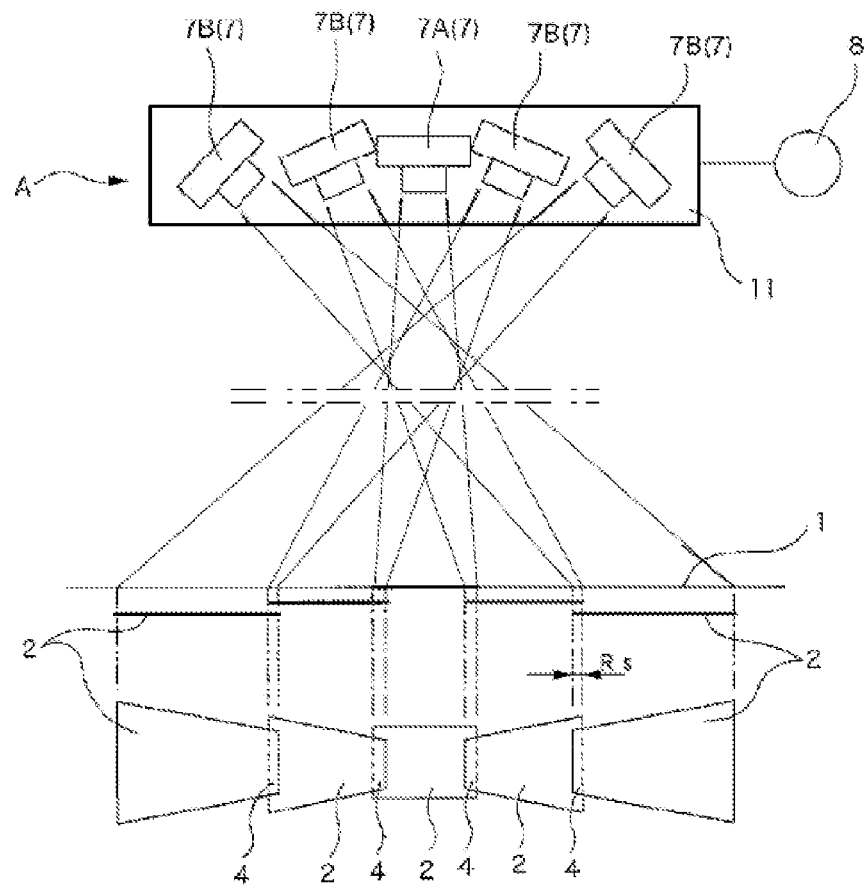
FIG. 1 is a view showing an image capturing device and image capturing conditions using the image capturing device.
Figure 1B:
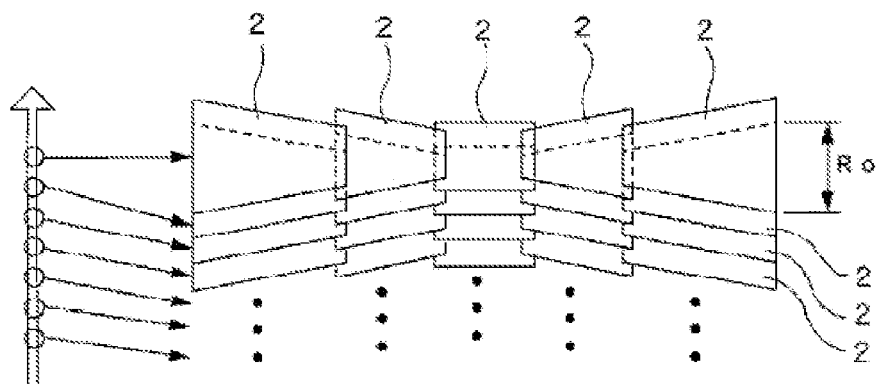
Figure 2A:
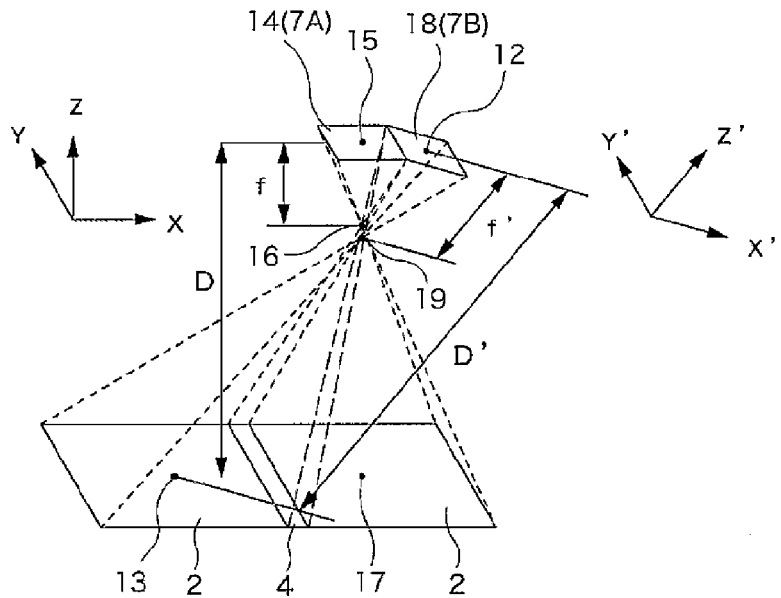
FIG. 2A is a view for explaining a relation between a focal length and an image capturing distance upon image capturing and the like, and FIG. 2B is a block diagram of an orthophoto image generating device.
Figure 2B:
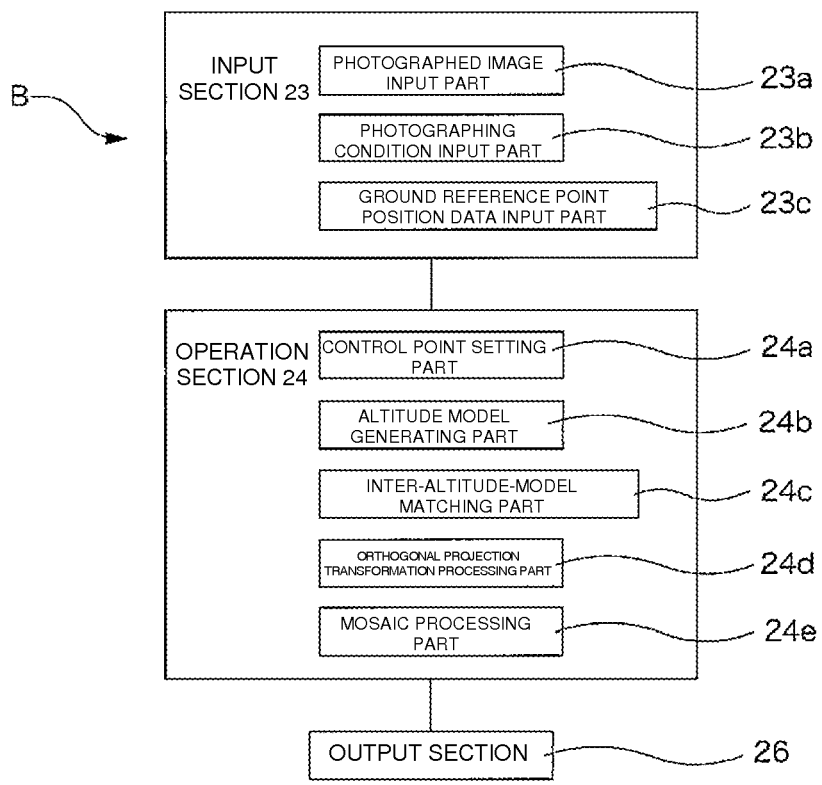
FIG. 2 is a view showing an outline of a method for generating an orthophoto image.
Figure 3A:
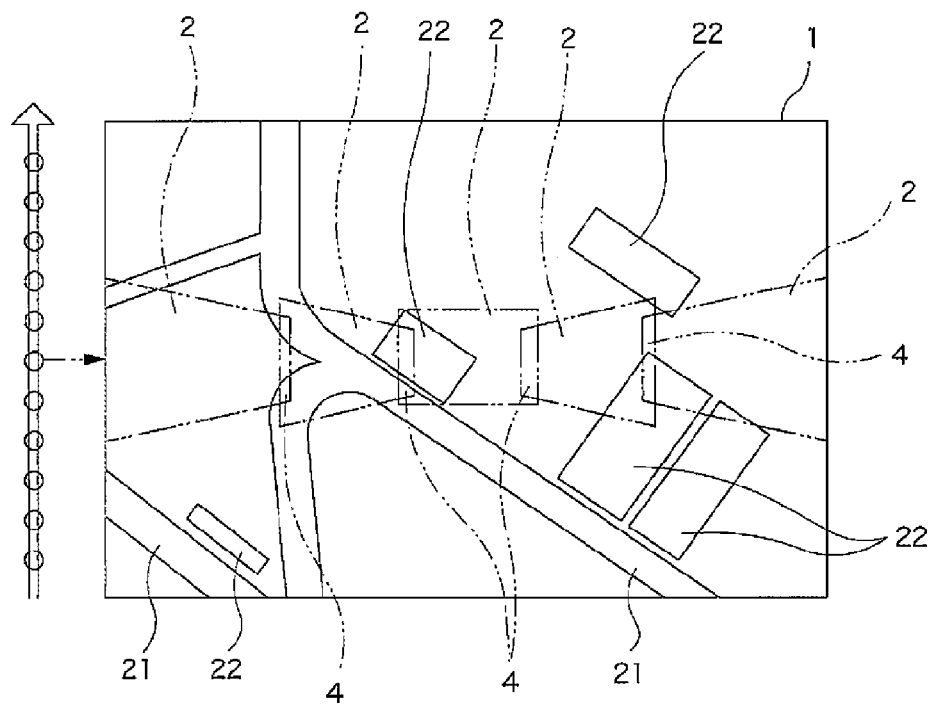
FIG. 3 is a view for explaining image capturing conditions of a target region.
Figure 3B:
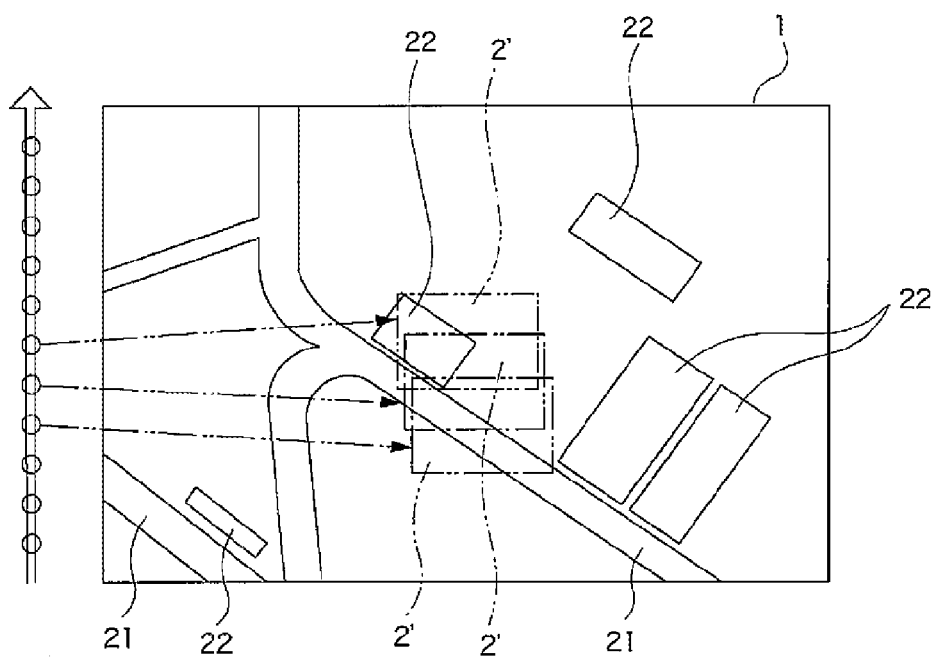
Figure 4A:
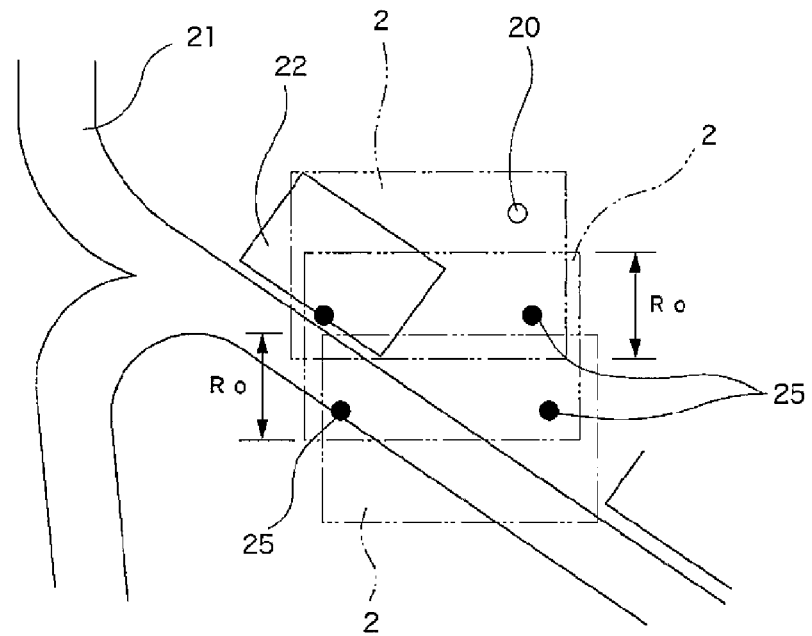
FIG. 4 is a view for explaining steps of generating rectangular-shaped elevation models respectively corresponding to images captured by cameras.
Figure 4B:
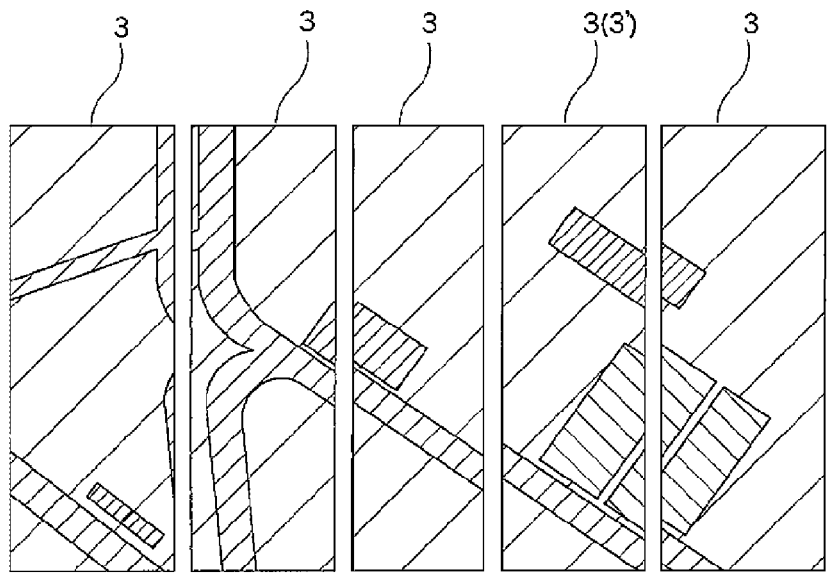
Figure 5A:
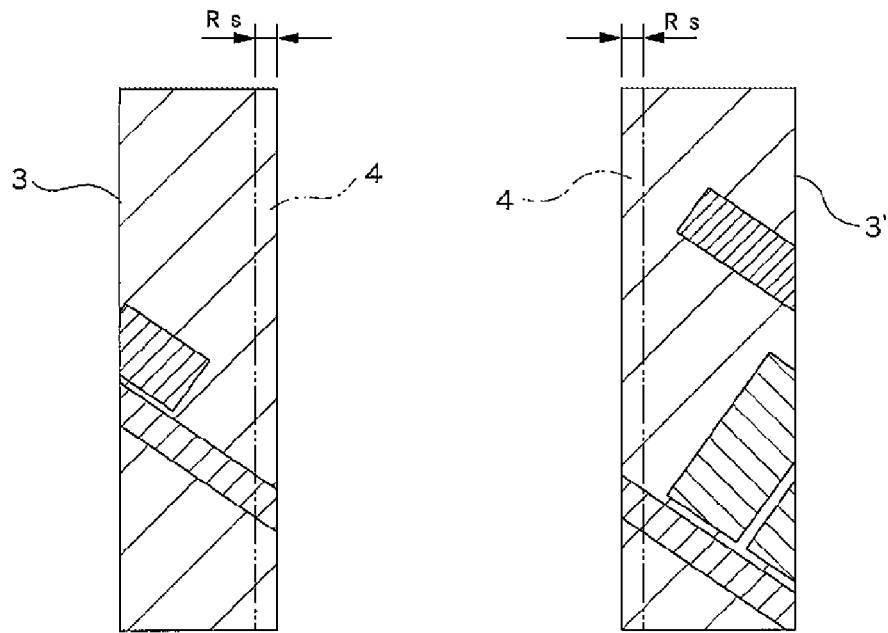
FIG. 5 is a view for explaining steps of matching the elevation models generated based on the images captured by the cameras.
Figure 5B:
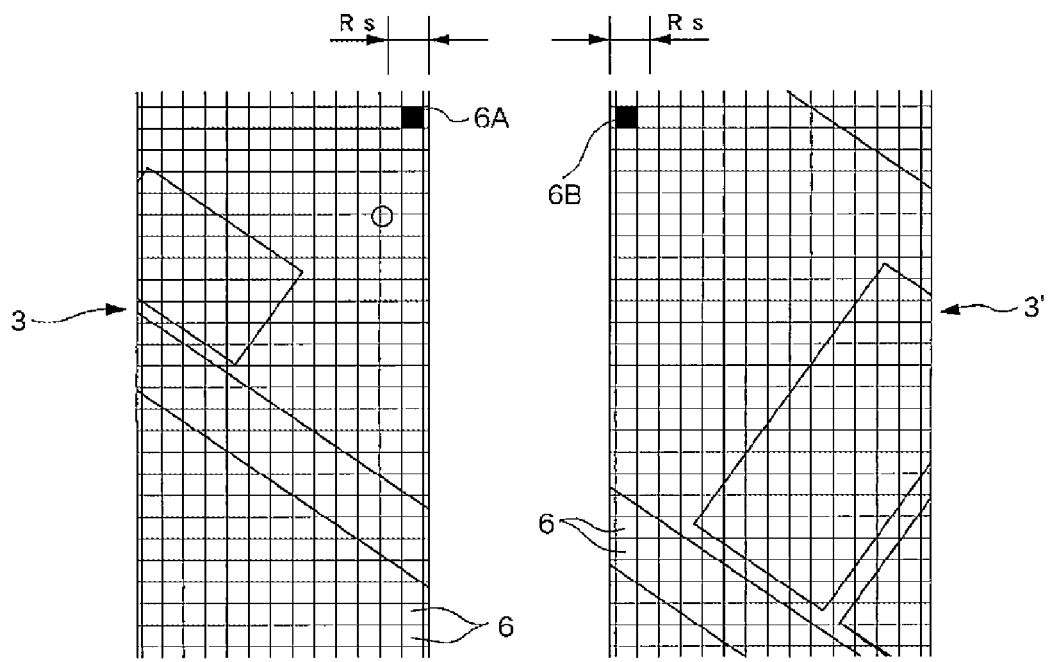
Figure 6A:
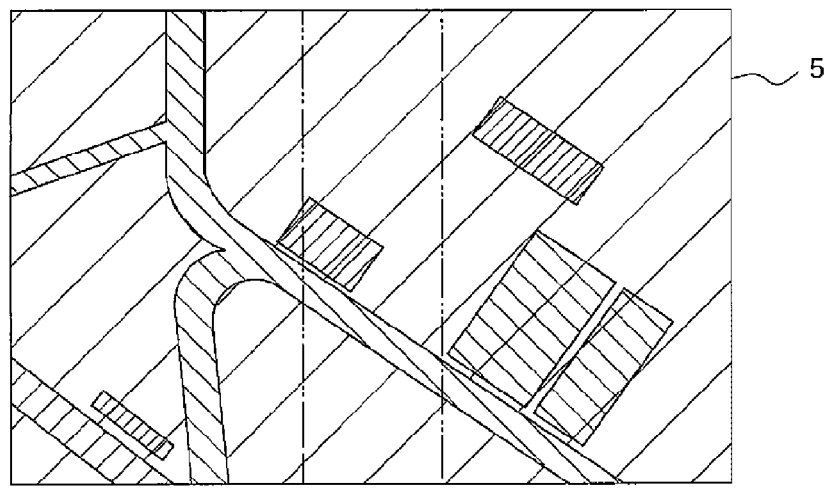
FIG. 6 is a view for explaining a situation that a captured image having a rectangular shape large in size in a flight direction is subjected to an orthogonal projection transformation processing, using an elevation model ranging the entire target region.
Figure 6B:
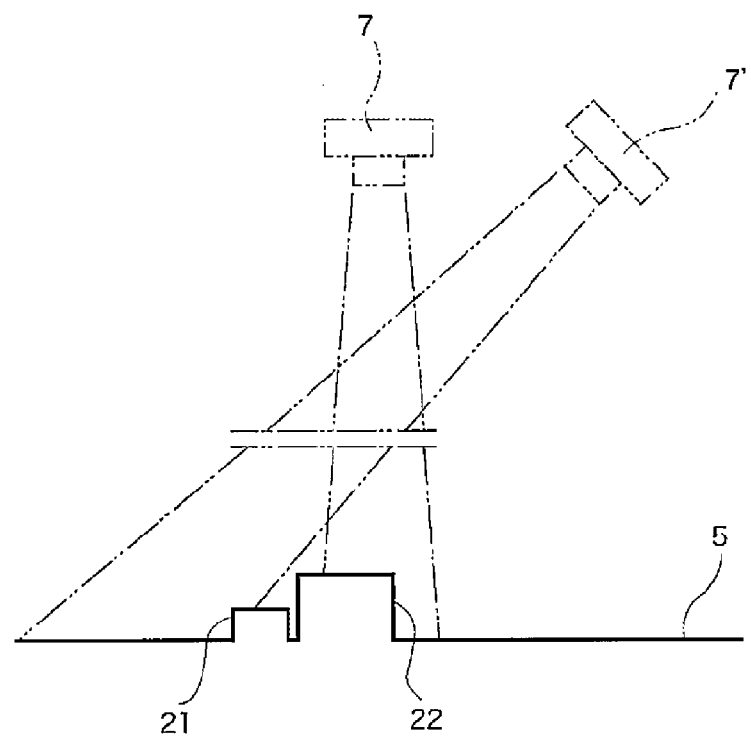
Figure 7:
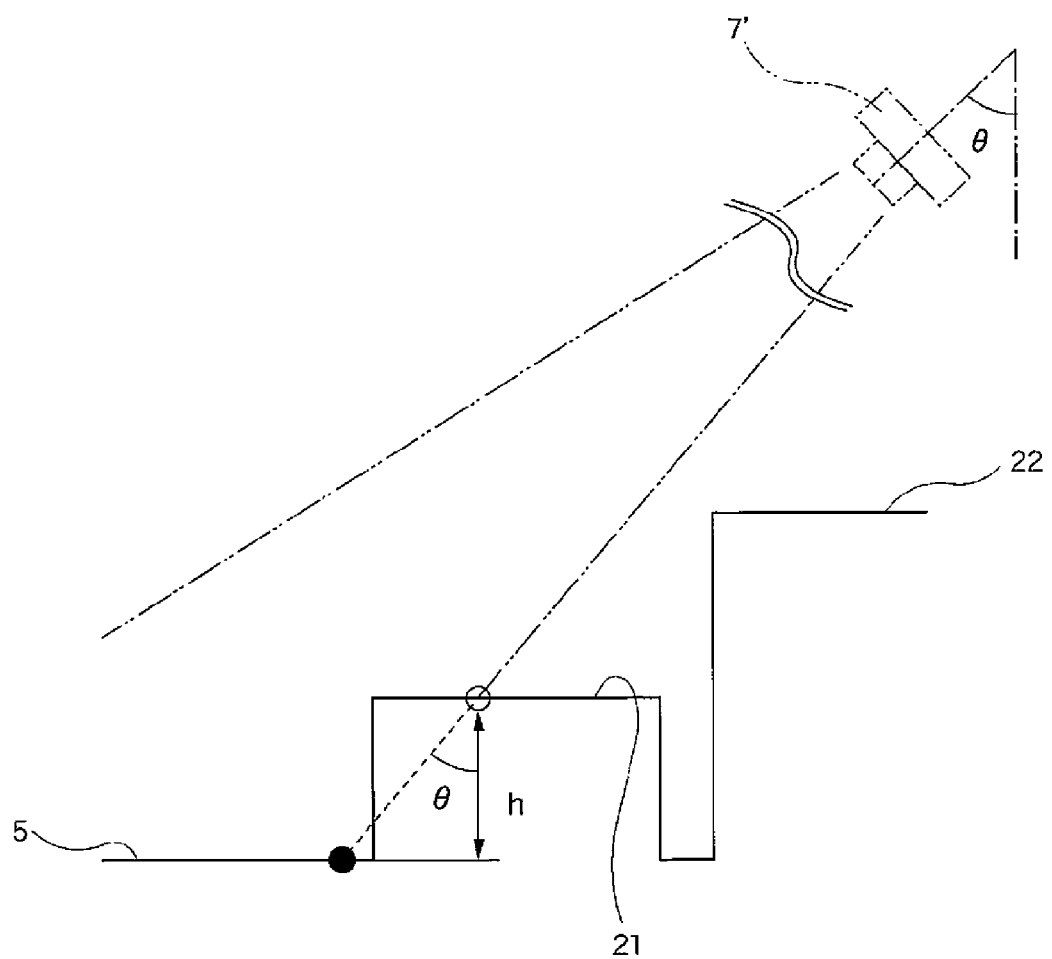
FIG. 7 is a view for explaining an image correction in an orthogonal projection transformation processing step.
Figure 8A:
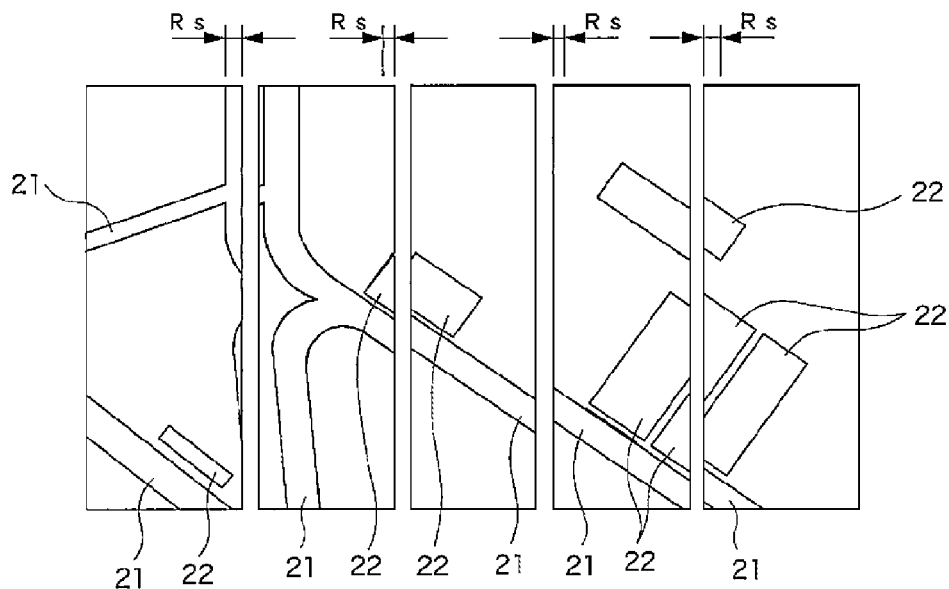
FIG. 8 is a view for explaining orthophoto images of captured images each having a rectangular shape large in size in the flight direction and an orthophoto image of the entire target region.
Figure 8B:
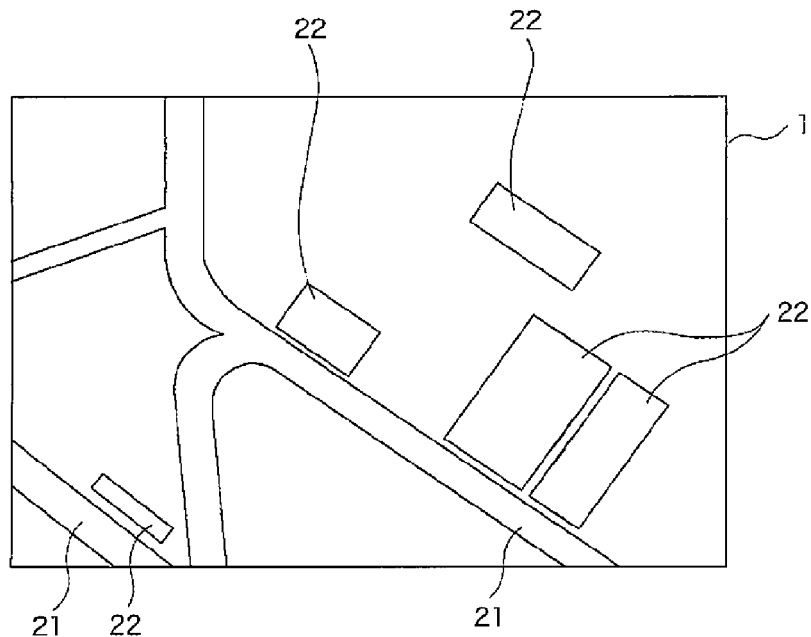
Figure 9:
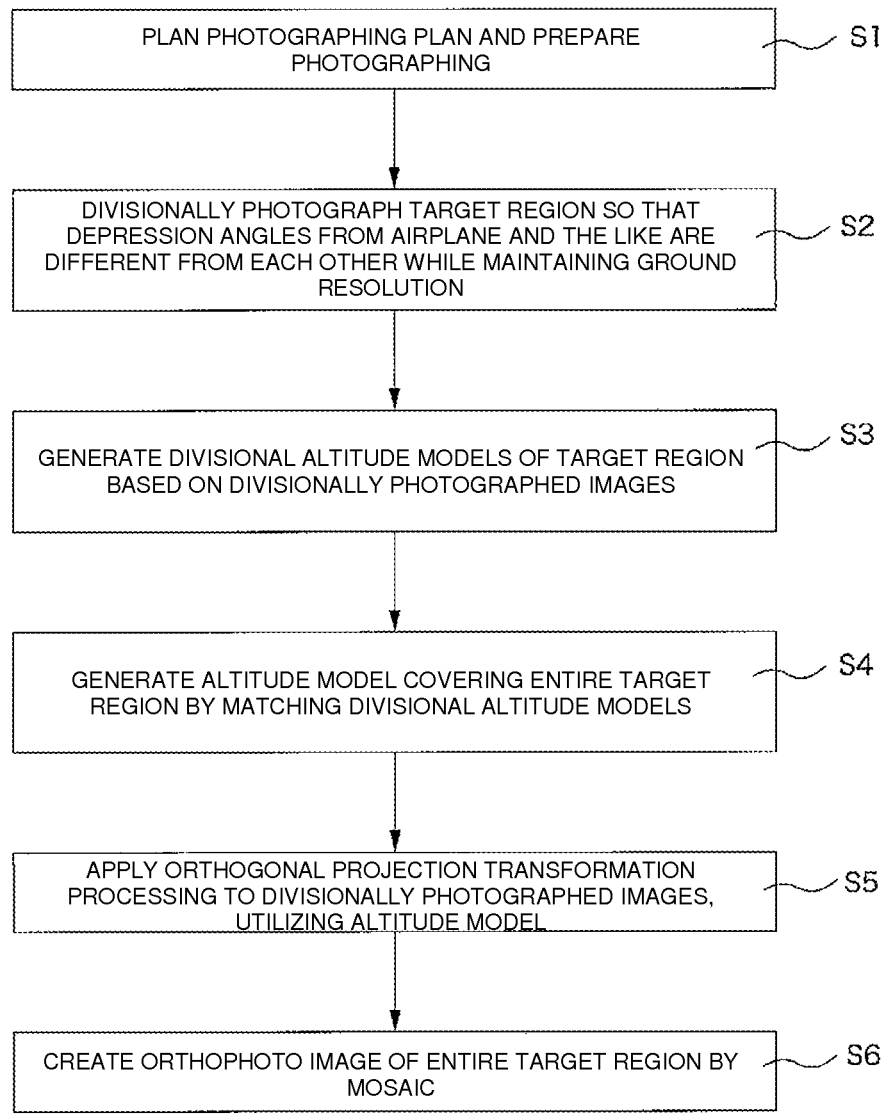
FIG. 9 is a view showing a procedure of generating the orthophoto image.

1 Target region
2 Divisionally-captured image

3 Elevation model generated based on each captured image
4 Image capturing overlap region
5 Elevation model of entire target region
6 Cell
7 Camera
7A Nadir camera
7B Obliquely-downward camera
8 Obliquely-downward camera setting part
f Focal length

What we claim is:

1. A method for generating an orthophoto image comprising the steps of:
    (A) divisionally-capturing a target region from a platform; and
    (B) thereafter generating an orthophoto image of an entire target region by applying an orthogonal projection transformation processing to respective divisionally-captured images by use of altitude information of an elevation model of the target region, wherein
    in the step of (A) divisionally-capturing the target region, a plurality of times of image capturing are repeated along a flight direction of the platform flying above the target region with a plurality of cameras as area sensors mounted in a direction perpendicular to the flight direction of the platform flying above the target region
        by (a1) rendering viewing angles of the plurality of cameras as being different from each other as well as rendering focal lengths of the plurality of cameras as being different from each other while maintaining a ground resolution of each of the plurality of cameras at a constant reference that is a predetermined ground resolution, along a direction perpendicular to the flight direction, and
        by (a2) maintaining the viewing angles of each of the plurality of cameras at the same in the flight direction as well as maintaining the focal lengths of each of the plurality of cameras at the same, along the flight direction, and wherein
    in the step of (B) generating the orthophoto image of the entire target region,
        (B1) a plurality of elevation models of strip-shaped regions are generated by stereo-matching a plurality of divisionally-captured images, which have been obtained in the same viewing angle and the same focal length by each said camera of said plurality of cameras, in the flight direction by use of tie points thereon with respect to image capturing overlap regions, image capturing position information of each camera of said plurality of cameras, and image capturing orientation information of each camera of said plurality of cameras, where the tie points have a function of associating relative positions of the divisionally-captured images to be matched in the flight direction,
        (B2) thereafter the plurality of elevation models of strip-shaped regions are matched in a direction perpendicular to the flight direction among overlap regions corresponding to image capturing overlap regions in the plurality of times of capturing performed in such a manner that the plurality of elevation models adjacent to each other are adjusted with respect to coordinate values of cells thereon corresponding to each other in the overlap region therebetween, and thereby the elevation model of the target region is generated, whereby the cells belonging to said overlap region are adjusted to each other such that the coordinate values of the adjusted cells satisfy a linear expression for adjustment; and
        (B3) whereby accuracy of each of the plurality of elevation models of the strip-shaped regions is enhanced while decrease of accuracy of the elevation model of the target region is suppressed.

2. The method for generating an orthophoto image according to claim 1, wherein
    in the divisionally-capturing, focal lengths are set, while ground resolutions are the same, with respect to a plurality of cameras mounted in an airplane so as to be directed at different viewing angles, and wherein
    in the generating an elevation model of target region, a plurality of elevation models of strip-shaped regions are generated from respective divisionally-captured images based on image capturing position information and image capturing orientation information of a camera obtained by GPS and IMU mounted in the airplane as well as on positional information of GCP set in a target region and captured, and thereafter, the plurality of elevation models of strip-shaped regions are matched by adjusting respective coordinate values, and wherein
    in the generating an orthophoto image, captured images are orthogonally-transformed based on altitude information of the elevation model of the entire target region as well as on the image capturing position information, the image capturing orientation information, and the positional information of the GCP, and thereafter, the captured images are connected by a mosaic processing.

3. The method for generating an orthophoto image according to claim 1, wherein
    in the image capturing, color image capturing is performed and an orthophoto image, which is kept in balance with respect to ground resolution and color depth, is obtained.

4. The method for generating an orthophoto image according to claim 1, wherein
    the divisional capturing includes image capturing in a direction at a nadir of a platform, and wherein
    with reference to an elevation model of strip-shaped region based on a captured image in a nadir direction, elevation models of strip-shaped regions based on captured images in other directions are aligned with respect to positions, and thereby elevation models of strip-shaped regions are matched.

5. The method for generating an orthophoto image according to claim 1, wherein
    a mesh is set on overlap regions corresponding to the image capturing overlap region, and a square sum of a difference of coordinate values between the elevation models of strip-shaped regions is minimized in each unit of a plurality of cells in the mesh, and thereby matching is performed.

* * * * *